United States Patent
Iwasawa

(10) Patent No.: US 7,271,722 B2
(45) Date of Patent: Sep. 18, 2007

(54) SECURITY SENSOR DEVICE HAVING OPTICAL AXIS ADJUSTMENT CAPABILITY

(75) Inventor: Masashi Iwasawa, Otsu (JP)

(73) Assignee: Optex Co., Ltd., Shiga (JP)

( * ) Notice: Subject to any disclaimer, the term of this patent is extended or adjusted under 35 U.S.C. 154(b) by 312 days.

(21) Appl. No.: 11/041,974

(22) Filed: Jan. 26, 2005

(65) Prior Publication Data

US 2005/0168711 A1 Aug. 4, 2005

(30) Foreign Application Priority Data

Feb. 2, 2004 (JP) .............................. 2004-025097

(51) Int. Cl.
 *G08B 13/08* (2006.01)
(52) U.S. Cl. .................. 340/545.5; 340/540; 340/541; 340/556; 340/693.6; 250/338.221
(58) Field of Classification Search ............. 340/545.3, 340/540, 541, 556, 693.6, 545.5; 250/338.1, 250/221
See application file for complete search history.

(56) References Cited

U.S. PATENT DOCUMENTS

| | | | |
|---|---|---|---|
| 5,334,972 A * | 8/1994 | Sugimoto et al. ........... | 340/556 |
| 5,596,310 A * | 1/1997 | Itoh ........................... | 340/331 |
| 5,801,376 A | 9/1998 | Haberl et al. | |
| 6,236,038 B1 | 5/2001 | Givet | |

FOREIGN PATENT DOCUMENTS

| | | |
|---|---|---|
| EP | 0 466 522 A1 | 1/1992 |
| EP | 0 964 272 A1 | 12/1999 |
| JP | 2002-124168 | 4/2002 |

OTHER PUBLICATIONS

Patent Abstracts of Japan, Publication No. 2002-279539; Sep. 27, 2002; Optex Co., Ltd.
Patent Abstracts of Japan, Publication No. 08-124042; May 17, 1996; Matsushita Electric Works.

* cited by examiner

*Primary Examiner*—Tai Nguyen
(74) *Attorney, Agent, or Firm*—Sughrue Mion, PLLC

(57) ABSTRACT

There is provided a security sensor device having an optical axis adjusting capability, which device includes a beam projecting unit (1) for projecting sensing waves, to which ID codes for specifying beam projectors (2) are applied, to a beam receiving unit (8) sequentially at predetermined intervals. The beam receiving unit (8) detects the level of light received by each of beam receivers (9) corresponding to or identified by the respective ID codes and transmits the received light levels to the beam projecting unit (1). According to these features, during the optical axis adjustment the levels of light received by the beam receivers (9) can readily be obtained on the side of the beam projecting unit (1), resulting in an accurate adjustment of optical axis between the beam projectors (2) and the beam receivers (9) in a short length of time with a simplified structure.

4 Claims, 2 Drawing Sheets

SECURITY SENSOR DEVICE HAVING OPTICAL AXIS ADJUSTMENT CAPABILITY

BACKGROUND OF THE INVENTION

1. Field of the Invention

The present invention relates to a security sensor device of a kind including a beam projecting unit, having a plurality of beam projectors, and a beam receiving unit having a plurality of beam receivers for receiving sensing waves such as an infrared beam, projected from the beam projectors towards the corresponding beam receivers so that the presence of a human body or the like can be detected when those sensing waves are simultaneously intercepted by the human body or the like. The present invention relates in particular to the adjustment of optical axis between each of the beam projectors and the respective beam receiver.

2. Description of the Prior Art

The security sensor device of the kind referred to above generally includes a beam projector for projecting a sensing wave such as an infrared beam and a beam receiver for receiving the optical detecting beam projected from the beam projector. An optical axis of the beam projector is aligned with that of the beam receiver. This security sensor device has a capability of defining an alert area or coverage ranging from a close range to a long range in terms of a linear distance so that the security sensor device can monitor the alert area as to the presence or absence of an intruder entering the alert area.

The adjustment of optical axis between the beam projector and the beam receiver is generally carried out during installation or maintenance servicing of the security sensor device in such a manner that the attendant worker looking through a sighting instrument manipulates an optical axis adjusting mechanism for moving the beam projector or the beam receiver in any of vertical and horizontal directions to perform a coarse adjustment of the optical axis. After this coarse adjustment of the optical axis, the attendant worker further manipulates the optical axis adjusting mechanism to perform a fine optical axis adjustment relying on a display indication of the level of light received by the beam receiver until the display indicates the maximum level of light received by the beam receiver. See, for example, the Japanese Laid-open Patent Publication No. 2002-279539.

It has, however, been found that the optical axis adjustment referred to above tends to become complicated, cumbersome and time-consuming particularly where a beam projecting unit makes use of upper and lower beam projectors and, similarly, a beam receiving unit makes use of corresponding upper and lower beam receivers. Specifically, where the beam projecting and receiving units are so arranged as to enable the upper and lower beam receivers to receive two infrared beams projected from the upper and lower beam projectors, respectively, so that an unauthorized entry of a human body into the alert area can be detected when those infrared beams are simultaneously intercepted by the human body, and if the alert area is defined a substantial distance away from the position of the beam projecting unit, the infrared beam projected from one of the upper and lower beam projectors tends to be received simultaneously by the upper and lower beam receivers as the projected infrared beam flares outwardly in the form of, for example, a cone of infrared light. Accordingly, in order for one of the beam receivers to be optically aligned with the mating beam projector, the use is required of a light shielding plate or the like to shield the infrared beam projected from such mating beam projector from falling onto the other of the beam receivers.

In order to alleviate the foregoing problems and inconveniences, the Japanese Laid-open Patent Publication No. 8-124042, for example, discloses an optical axis adjusting method, in which one of the beam receivers that is to be optically aligned with the beam projector then projecting an infrared beam is activated to determine the level of the infrared beam projected from the beam projector and received by such one of the beam receivers so that the optical axis alignment between each of the beam projectors and the mating beam receiver can be accomplished. In this publication, the beam receivers are provided with respective electric switches each operable to selectively switch the corresponding beam receiver on and off one at a time. According to this known method, one of the beam receivers, which is to be inputted to a signal processing circuit unit, is switched on while the other beam receiver or receivers are switched off, so that only the beam receiver to be optically aligned with the mating beam projector can be activated.

Even in the system disclosed in the second mentioned patent publication, the optical axis adjustment similarly tends to become complicated, cumbersome and time-consuming by the following reason. Specifically, since one of the beam receivers that has been switched on receives the infrared beams from both of the beam projectors, the optical axis adjustment of one of the upper and lower beam receivers requires only one of the beam projectors, which is associated with such one of the upper and lower beam receivers, to project the infrared beam. Accordingly, determination of the level of light received by each of the upper and lower beam receivers tends to be complicated and cumbersome, resulting in a substantial length of time required to accomplish the adjustment of the individual optical axes between the beam projectors and the associated beam receivers.

Also, since respective electric switches of the beam projectors and receivers are required to be operated simultaneously, a mechanism for achieving the simultaneous operation of those switches tends to become complicated and, hence, an attendant worker has to be assigned for each of the beam projector side and the beam receiver side. In addition, it often occurs that even though switch settings for the upper and lower beam receivers are in error, the optical axis adjustment tends to be performed without the erroneous switch setting being recognized.

SUMMARY OF THE INVENTION

In view of the foregoing, the present invention has been devised to substantially eliminate the above discussed problems and inconveniences inherent in the prior art security sensor devices and is intended to provide an improved security sensor device having a capability of adjusting the optical axes, in which, where plural pairs of beam projectors and receivers are provided, the adjustment of optical axis between the beam projector and the beam receiver of each pair can be accurately accomplished by a single attendant worker in a short length of time with a simplified structure.

In order to accomplish the foregoing object, the present invention provides a security sensor device, which includes a beam projecting unit including a plurality of beam projectors for projecting respective sensing waves, a drive circuit for driving each of the beam projectors, and a beam receiving unit including a plurality of beam receivers each for receiving the sensing wave projected by the respective beam projector. This security sensor device is operable to detect a human body or the like when the sensing waves are intercepted by the human body or the like.

In this security sensor device, for the adjustment of optical axis between the beam projector and the beam receiver of each pair to be performed, the beam projecting unit includes an ID code applier for applying to each of the sensing waves an ID code for specifying one of the beam projectors, and a transmission controller for controlling the drive circuit to enable the sensing waves, having the respective ID codes applied thereto, to be sequentially transmitted at predetermined intervals. On the other hand, the light receiving unit includes an ID code identifier for identifying the ID code applied to each of the sensing waves received thereby, a received light level detector for detecting the level of light received by each beam receiver corresponding to or identified by each of the ID codes, and a transmitter for transmitting the received light level of each beam receiver to the beam projecting unit.

According to the present invention, since the beam projecting unit is operable to project the sensing waves, to which the ID codes for specifying the beam projectors are applied, to the beam receiving unit sequentially at predetermined intervals and the beam receiving unit is operable to detect the levels of light received by the beam receivers, corresponding to or identified by the respective ID codes and then to transmit the received light levels to the beam projecting unit, it is possible to transmit the sensing waves with the ID codes from the plural beam projectors at the predetermined intervals so that the levels of light received by the respective beam receivers during the optical axis adjustment can readily be obtained according to the ID codes, resulting in an accurate adjustment of the optical axes between the beam projectors and the beam receivers in a short length of time with a simplified structure. In addition, since the beam receiving unit transmits the levels of light detected to the beam projecting unit, it is possible for a single attendant worker to accomplish the optical axis adjustment.

In a preferred embodiment of the present invention, each of the beam projecting unit and the beam receiving unit includes a received light level display for providing a visual indication of the received light level of each of the beam receivers. According to this feature, based on the display of the levels of light received by the respective beam receivers, the adjustment of optical axis between the beam projectors and the respective beam receivers can easily be accomplished.

In a further preferred embodiment of the present invention, the ID code applier may apply the ID code to the sensing wave by pulse modulating the sensing wave.

In a still further preferred embodiment of the present invention, the ID code applier may apply to the sensing wave an ID code for identifying a normal operating mode, in which the security sensor device monitors an alert area in a usual manner, which ID code is different from the ID codes used to specify the respective beam projectors, during an adjustment mode during which an optical axis adjustment is performed. This feature allows the security sensor device of the present invention to perform a normal monitoring of the alert area.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENT

Figure 1:
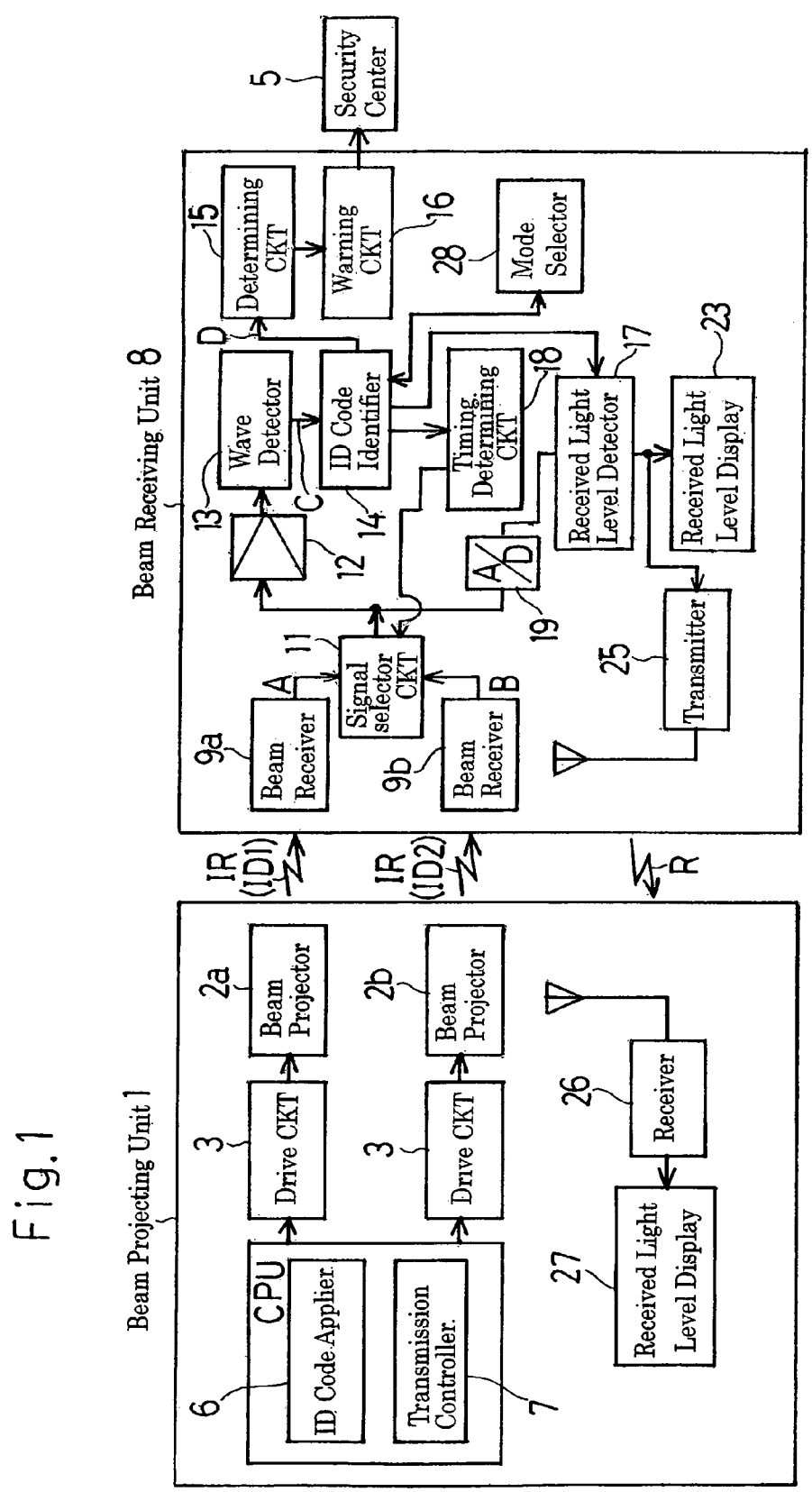
FIG. 1 is a block diagram of a security sensor device having an optical axis adjusting capability according to a preferred embodiment of the present invention.

A preferred embodiment of the present invention will now be described with reference to FIGS. 1 and 2. FIG. 1 illustrates a block diagram of a security sensor device having an optical axis adjusting capability according to the preferred embodiment of the present invention. The security sensor device includes a beam projecting unit 1 and a beam receiving unit 8, so mounted on respective supports such as building walls or poles disposed at opposite ends of a rectilinear alert area as to confront with each other. The beam projecting unit 1 includes a plurality of, for example, upper and lower, beam projectors 2 and, similarly, the beam receiving unit 8 includes upper and lower beam receivers 9 optically aligned respectively with the upper and lower beam projectors 2.

The security sensor device to which the present invention pertains is utilized to detect a human body or the like when two sensing waves projected from the beam projectors 2a and 2b (or generally identified by 2) towards the mating beam receivers 9a and 9b (or generally identified by 9) are simultaneously intercepted by the human body or the like, and has an optical axis adjusting capability for adjusting the respective optical axes between the upper and lower beam projectors 2 and the upper and lower beam receivers 9 when set in an adjusting mode.

The beam projecting unit 1 includes, in addition to the upper and lower beam projectors 2a and 2b each operable to project a sensing wave such as an infrared beam IR, drive circuits 3 each operable to drive the respective beam projector 2a or 2b. Each of the beam projectors 2a and 2b includes a beam projecting element such as an infrared light emitting diode, and a projector optical system, for example, a beam projecting lens or a reflecting mirror for forming the infrared beam IR to be projected. Each of the drive circuits 3 is operable to drive the associated beam projecting element at a predetermined frequency and then to transmit a carrier wave, which is the sensing wave (infrared beam IR) and which has been pulse modulated according to one of predetermined ID codes as will be described later.

The beam projecting unit 1 is provided with an ID code applier 6 and a transmission controller 7 both incorporated in a central processing unit (CPU). The ID code applier 6 is operable to apply the predetermined ID codes, which are assigned to specify the respective beam projectors 2a and 2b, to the infrared beams IR (sensing waves) projected from the beam projectors 2a and 2b. The application of the ID codes is carried out, for example, by modulating the carrier waves (infrared beams IR) according to the ID codes. The ID codes can be applied in the form of a binary signal. By way of example, the first ID code for specifying the beam projector 2a is represented by ID1, whereas the second ID code for specifying the beam projector 2b is represented by ID2. So long as the security sensor device of the present invention is set in a normal operating mode, in which the security sensor device monitors the alert area in a usual manner, the third ID code represented by ID3 is applied to each of the sensing waves projected from the beam projectors 2a and 2b during the normal operating mode. It is, however, to be noted that in place of ID3, either one of ID1 and ID 2 may be used during the normal operating mode.

The transmission controller 7 controls the drive circuits 3 to allow the sensing waves, having the respective ID codes applied thereto, to be sequentially transmitted at predetermined intervals. By way of example, the transmission controller 7 is operable to transmit the first modulated carrier wave, i.e., the carrier wave modulated according to the first ID code ID1 associated with the beam projector 2a, to the beam receiving unit 8 by causing the associated drive circuit 3 to drive the beam projector 2a and, subsequently after a predetermined interval, to transmit the second modulated carrier wave, i.e., the carrier wave modulated according to the second ID code ID2 associated with the beam projector 2b, to the beam receiving unit 8 by causing the associated drive circuit 3 to drive the beam projector 2b. Such transmission is alternately repeated.

The beam projecting unit 1 also includes a receiver 26 for receiving a signal indicative of the level of light received by each of the beam receivers 9, which signal is transmitted from a transmitter 25 included in the beam receiving unit 8, and a received light level display 27 for displaying such level.

On the other hand, the beam receiving unit 8 includes the upper and lower beam receivers 9a and 9b, which are operatively associated with the upper and lower beam projectors 2a and 2b, respectively and which are operable to receive the infrared beams IR to which the respective ID codes are assigned. Each of the beam receivers 9 includes a transmission optical system such as, for example, a light receiving lens or a light collecting mirror and a beam receiving element such as a photodiode.

The beam receiving unit 8 also includes a signal selector circuit 11, an amplifier 12, a wave detector 13, an ID code identifier 14, a determining circuit 15, a warning circuit 16 and a timing determining circuit 18. This beam receiving unit 8 further includes a received light level detector 17, a received light display 23, a transmitter 25 and a mode selector 28.

In the beam receiving unit 8, the beam receivers 9a and 9b receive the infrared beams IR, to which the ID codes ID1 and ID2 or ID3, each in the form of a binary signal, are applied, and then output corresponding signals A and B indicative of the amount of light received by the beam receivers 9a and 9b, respectively.

The ID code identifier 14 is operable to identify the received light amount signals A and B which have been applied the respective ID codes. The timing determining circuit 18 is operable to determine the reception timing at which the received light amount signals A and B having the respective ID codes are received, on the basis of the ID codes identified by the ID code identifier 14.

The signal selector circuit 11 is operable to direct alternately the received light amount signals A and B to the amplifier 12 according to the reception timing determined by the timing determining circuit 18. The signals A and B are then alternately inputted to the wave detector 13 after having been amplified by the amplifier 12. The wave detector 13 subsequently outputs a signal C indicative of the level of a pulse modulated light from which an external disturbing light component has been removed.

At the same time, in order to determine the level of each of the received light amount signals A and B having the respective ID codes ID1 and ID2, the signal selector circuit 11 directs the signals A and B alternately to the received light level detector 17 through an analog-to-digital (A/D) converter 19 according to the reception timing. In the case of the received light amount signal to which ID3 is applied, the determination of the timing performed by the timing determining circuit 18 is invalidated or nullified by the ID code identifier 14 and, therefore, the signal selector circuit 11 combines the received light amount signals A and B without selecting the signals A and B and then transmit the composite signal to the determining circuit 15 through the amplifier 12, the wave detector 13 and the ID code identifier 14.

The determining circuit 15 operates to determine if the level of the composite signal is lower than a predetermined level of detection which indicates that an intruder is present. The determining circuit 15 outputs a detection signal D to the warning circuit 16 in the event that the composite signal is lower than the predetermined detection level. The warning circuit 16 is then triggered in response to the detection signal D to supply a warning signal to a security center 5 to thereby inform the security center 5 of the presence of the intruder within the alert area. Simultaneously therewith, in order to determine the level of the received light amount signals A and B to which the ID codes ID3 have been applied, the signal selector circuit 11 also transmits the signals A and B to the received light level detector 17 through the A/D converter 19.

The mode selector 28 is operable to select one of an adjustment mode, in which the beam projectors 2 and the beam receivers 9 are optically aligned with each other, respectively, and the normal operating mode, in which the security sensor device monitors the alert area in a usual manner. This mode selector 28 selects one of the adjustment mode and the normal operating mode automatically based on the ID code identified by the ID code identifier 13. For example, the adjustment mode is selected when the ID codes ID1 and ID2 are identified by the ID code identifier 13, but the normal operating mode is selected when the ID code ID3 is identified by the ID identifier 13. It is, however, to be noted that this mode selector 28 is provided with a manually operated mode selecting switch and, therefore, the selection of one of the adjusting and normal operating modes can be carried out manually as well.

Although the optical alignment between the beam projectors 2a and 2b and the beam receivers 9a and 9b is carried out while the security sensor device is set in the adjustment mode, the optical alignment can be carried out while the security sensor device is set in the normal operating mode.

The received light level detector 17 is operable to detect the level of light received by each of the beam receivers 9a and 9b having the respective ID codes assigned thereto and is activated when any one of the ID codes ID1 and ID2 is identified by the ID code identifier 14. Since, as hereinbefore described, the infrared beams IR having the respective ID codes applied thereto in the beam projecting unit 1 are alternately transmitted at respective predetermined intervals, in the light receiving unit 8 the reception timing at which the received light amount signals A and B having the respective ID codes are received is alternately determined by the timing determining circuit 18 based on the ID codes identified by the ID code identifier 14 and the signals A and B are directed to the received light level detector 17 through the A/D converter 19 by the signal selector circuit 11 according to the reception timing. Accordingly, the received light level of each of the infrared beams IR and the respective ID codes applied thereto can be correlated in the received light level detector 17 based on the reception timing.

In this way, the need has been eliminated to use the shielding plate and the switches provided in the upper and lower beam projectors such as practiced in the prior art system. Since in the present invention the alternate transmission of the infrared beams IR having the respective ID codes applied thereto allows the received light level associated with the beam projector 2a and the beam receiver 9a and the received light level associated with the beam projector 2b and the beam receiver 9b to be obtained during the optical axis adjustment, the optical axis adjustment between the beam projectors 2 and the beam receivers 9 can be accomplished in a short length of time with a simplified structure.

The received light level display 23 is operable to provide a visual indication of the received light level proportional to the amount of light received by each of the beam receivers 9. The transmitter 25 is operable to transmit to the beam projecting unit 1 a received light level display signal in a coded form, which is indicative of the amount of light received by any one of the beam receivers 9. The coded received light level display signal may be transmitted as, for example, a wireless signal R. It is, however, to be noted that in place of the wireless signal R, a modulated infrared beam IR or the like may be employed for transmission to the beam projecting unit 1.

Each of the received light amount signals A and B is supplied through the A/D converter 19 to the received light level detector 17 which subsequently outputs the received light level display signal indicative of the amount of the received light to the received level display 23 and, therefore, the level of light received by the beam receivers 9a and 9b can be displayed by the received light level display 23. The wireless signal R emerging from the transmitter 25 is received by the receiver 26 of the beam projecting unit 1, which decodes and outputs the received light level display signal. Therefore, the received light level display 27 in the beam projecting unit 1, upon receipt of the decoded received light level display signal from the receiver 26, displays the level of the light received by each of the beam receivers 9a and 9b.

As described above, since the level of the light received by each of the beam receivers 9a and 9b can be displayed not only in the beam projecting unit 1 but also in the beam receiving unit 8, the optical axis adjustment between the beam projectors 2a and 2b and the associated beam receivers 9a and 9b can easily be performed. Also, since the received light level detected in the beam receiving unit 8 is transmitted to the beam projecting unit 1 and since none of the beam receivers 9a and 9b need be shielded, no attendant worker is required on the side of the beam receiving unit 8 and a single attendant worker can perform the optical axis adjustment.

Figure 2:
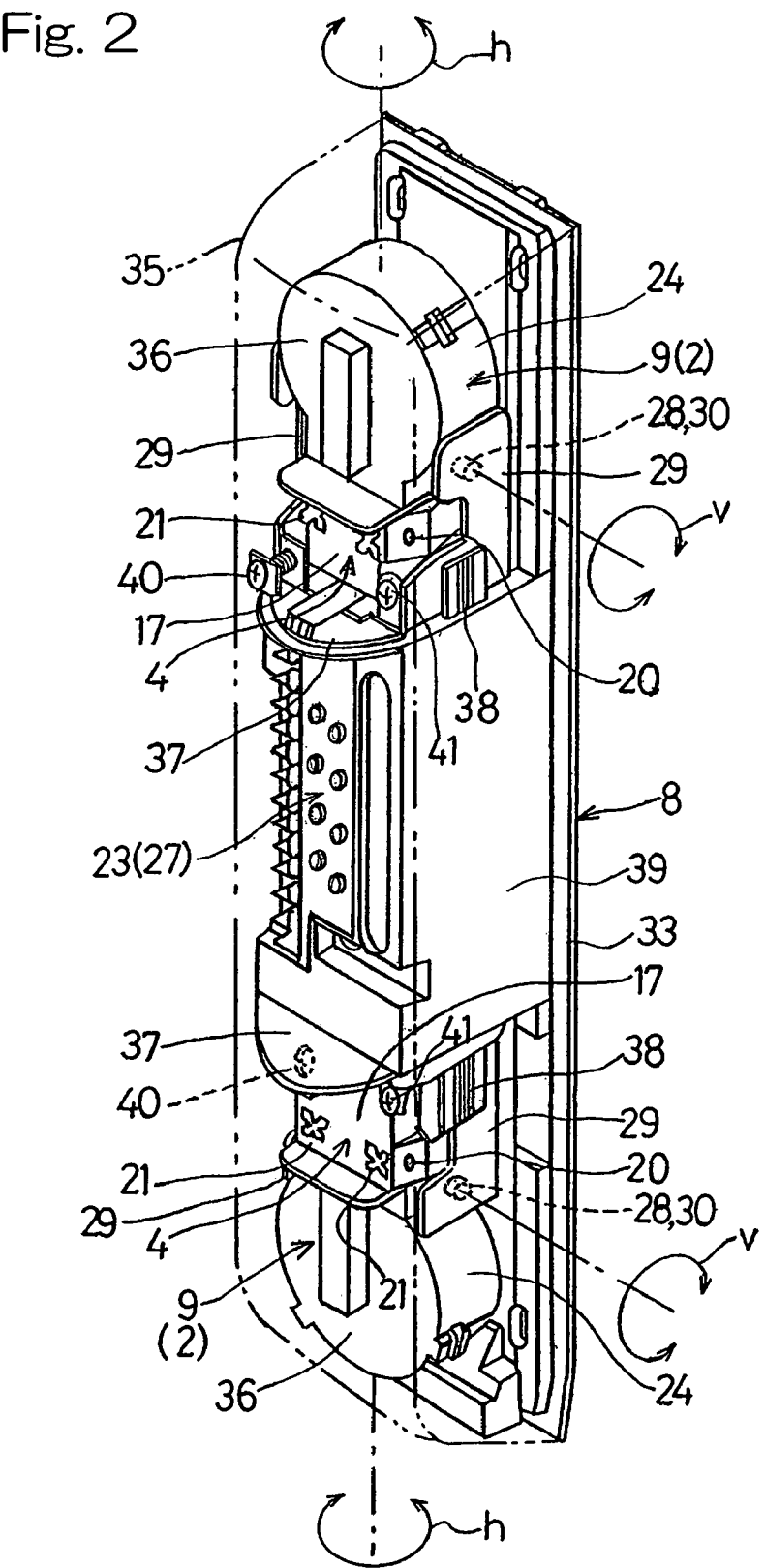
FIG. 2 is a perspective view of a beam receiving unit employed in the security sensor device shown in FIG. 1.

Referring now to FIG. 2, there is shown the beam receiving unit 8 in a perspective representation. It is to be noted that the beam projecting unit 1 is of a structure substantially similar to that of the beam receiving unit 8 and, therefore, some of the reference numerals used to designate component parts of the beam projecting unit 1, which are similar to those of the beam receiving unit 8 are also shown in FIG. 2 in parentheses.

The beam receiving unit 8 includes an outer casing made up of a mounting base 33 adapted to be fitted to a support surface such as a wall or a pole, and a cover 35 detachably mounted on the mounting base 33 for covering the electric sensor circuit arrangement. Each of the beam receivers 9 has a light receiving element positioned at the focal point of a light collecting mirror 24 of a type having an opening covered by a mirror cover 36.

A sighting instrument 4 used for the coarse adjustment of optical axis includes left and right sighting windows 20 defined in front side faces, left and right sighting ports 21 and a pair of bearing bushes 28 provided in rear side faces. A sighting mirror, although not shown, is disposed inside the beam receiving unit 8 and positioned between the sighting ports 21 on a sighting axis.

As an optical axis adjusting mechanism, upper and lower portions of a terminal support casing 39 disposed in an intermediate portion of the mounting base 33 are provided with rotary plates 37 for rotation about a vertical axis in either one of opposite directions shown by h. The rotary plate 37 in each of the upper and lower portions of the terminal support casing 39 has a pair of support plates 29 secured rigidly thereto, with a manipulating plate 38 fixed to each of outer side faces of the support plates 29. Thus, when the manipulating plate 38 is turned, the horizontal angle of the light receiver can be coarse adjusted. Fine adjustment of the horizontal angle can be accomplished by turning an adjustment screw 40 in either one of the opposite directions.

Also, the left and right bearing bushes 28 of the sighting instruments 4 are rotatably mounted on respective support shafts 30 carried by the associated support plates 29 for rotation about the support shafts 30 in either one of opposite directions shown by v. Accordingly rotation of the sighting instruments 4 about the respective support shafts 30 can be accomplished by turning associated adjustment screws 41 in either one of the opposite directions to thereby adjust the vertical angles of the beam receivers 9.

While the security sensor device is so constructed as hereinabove described, the operation to finely adjust the optical axis based on the received light level, which takes place following the coarse adjustment of the optical axis using the sighting instruments 4, will now be described. At the outset, the infrared beams IR having the ID codes ID1 and ID2 applied thereto by the ID code applier 6 for specifying the respective beam projectors 2a and 2b within the beam projecting unit 1 are sequentially transmitted from the beam receivers 2a and 2b to the beam receiving unit 8 at the predetermined intervals with the associated drive circuits 3 being driven by the transmission controller 7.

In the beam receiving unit 8, the infrared beams IR from the corresponding beam projectors 2a and 2b are received by the respective beam receivers 9a and 9b, with the ID codes ID1 and ID2 identified by the ID code identifier 14, followed by the determination of the reception timings of the received light amount signals A and B, having the respective ID codes ID1 and ID2, by the timing determining circuit 18. The received light amount signals A and B are then distributed by the signal selector circuit 11 according to the determined reception timings to the received light level detector 17 through the A/D converter 19. The received light level detector 17 detects the received light levels received by the beam receivers 9a and 9b and each level is subsequently displayed by the received light level display 23 and at the same time is transmitted to the beam projecting unit 1 by the transmitter 25.

In response to the transmitted signal indicative of the received light level, the received light level display 27 of the beam projecting unit 1 provides a visual indication of the received light level. Based on the display of the received light level, the fine adjustment of optical axis between the beam projector 2 and the corresponding beam receivers 9a and 9b can be performed by the optical axis adjusting mechanism discussed hereinabove.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although in describing the foregoing embodiment the sighting instruments 4 have been shown and described as used to accomplish the coarse adjustment of the optical axis, the use of the sighting instruments 4 can be dispensed with if so desired and, instead, the coarse adjustment may be performed based on the detected received light level as is the case with that for the fine adjustment.

Also, although the use has been made of the infrared beam for the sensing wave, microwaves may be equally employed therefor.

Accordingly, such changes and modifications are, unless they depart from the scope of the present invention as delivered from the claims annexed hereto, to be construed as included therein.

What is claimed is:

1. A security sensor device having an optical axis adjusting capability, which device comprises:
    a beam projecting unit including a plurality of beam projectors for projecting respective sensing waves;
    a drive circuit for driving each of the beam projectors;
    a beam receiving unit including a plurality of beam receivers each for receiving the sensing wave projected by the respective beam projector, the security sensor device being operable to detect a human body when the sensing waves are intercepted by the human body;
    wherein for the adjustment of optical axis between the beam projector and the beam receiver of each pair to be performed, the beam projecting unit includes an ID code applier for applying to each of the sensing waves an ID code for specifying one of the beam projectors, and a transmission controller for controlling the drive circuit to enable the sensing waves, having the respective ID codes applied thereto, to be sequentially transmitted at predetermined intervals; and
    wherein the light receiving unit includes an ID code identifier for identifying the ID code applied to each of the sensing waves received thereby, a received light level detector for detecting the level of light received by each beam receiver corresponding to or identified by each of the ID codes, and a transmitter for transmitting the received light level of each beam receiver to the beam projecting unit.

2. The security sensor device as claimed in claim 1, wherein each of the beam projecting unit and the beam receiving unit also includes a received light level display for providing a visual indication of the received light level of each of the beam receivers.

3. The security sensor device as claimed in claim 1, wherein the ID code applier applies the ID code to the sensing wave by pulse modulating the sensing wave.

4. The security sensor device as claimed in claim 1, wherein the ID code applier applies to the sensing wave an ID code for identifying a normal operating mode, in which the security sensor device monitors an alert area in a usual manner, which ID code is different from the ID codes used to specify the respective beam projectors during an adjustment mode in which an optical axis adjustment is performed.

* * * * *